Figure 4:
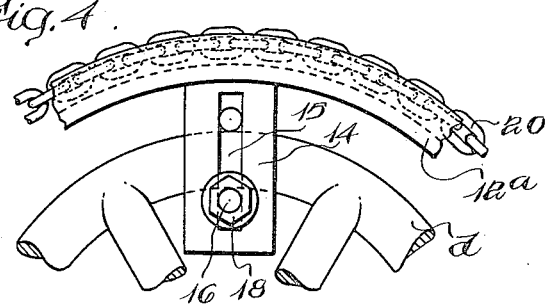

I. N. BABBITT.
SPROCKET ATTACHMENT FOR VALVE HANDLES.
APPLICATION FILED JAN. 30, 1915.
1,151,749.
Patented Aug. 31, 1915.
2 SHEETS—SHEET 1.
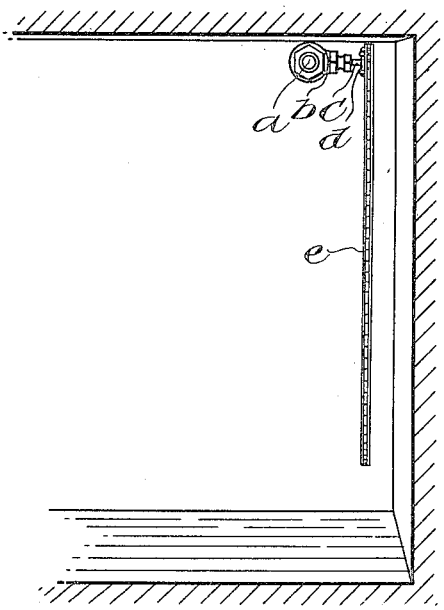
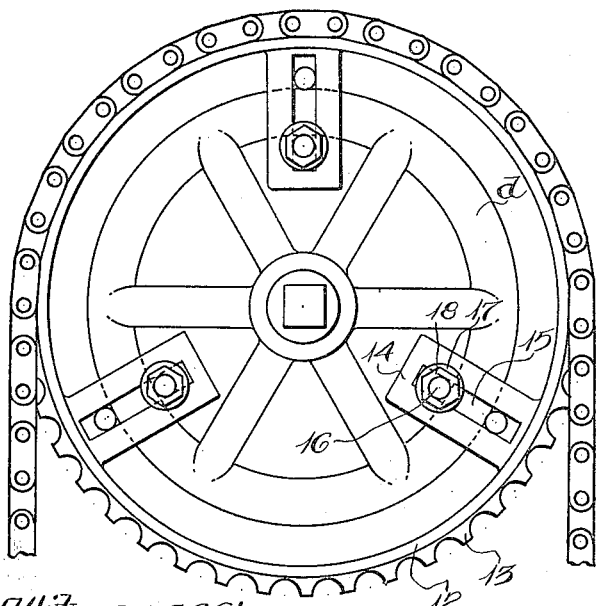
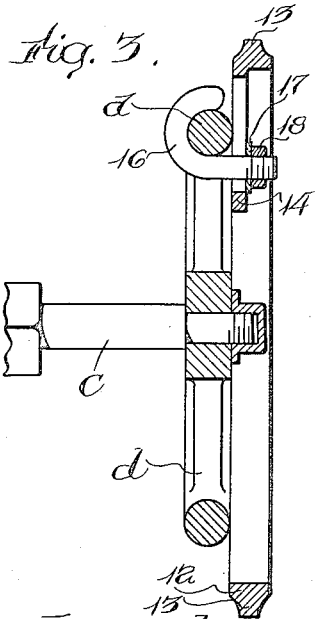

I. N. BABBITT.
SPROCKET ATTACHMENT FOR VALVE HANDLES.
APPLICATION FILED JAN. 30, 1915.

1,151,749.

Patented Aug. 31, 1915.
2 SHEETS—SHEET 2.

Witnesses:
P. W. Pezzetti
D. L. Smith

Inventor:
Isaac N. Babbitt
by Hughes Bruun ... May
Attys.

COLUMBIA PLANOGRAPH CO., WASHINGTON, D. C.

UNITED STATES PATENT OFFICE.

ISAAC N. BABBITT, OF FAIRHAVEN, MASSACHUSETTS.

SPROCKET ATTACHMENT FOR VALVE-HANDLES.

1,151,749.  Specification of Letters Patent.  Patented Aug. 31, 1915.

Application filed January 30, 1915. Serial No. 5,223.

*To all whom it may concern:*

Be it known that I, ISAAC N. BABBITT, a citizen of the United States, and resident of Fairhaven, in the county of Bristol and State of Massachusetts, have invented certain new and useful Improvements in Sprocket Attachments for Valve-Handles, of which the following is a specification.

The present invention relates to an attachment for hand wheels or handles of valves to enable such valves to be opened and closed from a point at a distance from the valve by means of a chain or the like.

In order to explain one of the purposes and advantages of my invention I will describe one class of use for which it is particularly adapted and designed. This is in connection with valves for steam pipes and other conduits which are installed in comparatively inaccessible places. For example, in engine and boiler rooms, basements, passageways, etc., conduits for steam, water, etc., are carried at such a height above the floor of the room or passage that the valves in such conduits cannot be reached by a man standing on the floor, and the use of a ladder or some other means by which the person wishing to operate the valve may raise himself above the floor is necessary in order to reach the valve. The necessity of bringing a ladder to the location of the valve which it is desired to open or close, often from a considerable distance, is at the least a cause of inconvenience and annoyance and may cause loss of valuable time. Heretofore in order to avoid this inconvenience and loss of time, sprocket wheels have been substituted for the hand wheels or handles on the stems of valves located in the positions indicated, and such sprocket wheels have been equipped with chains extending to within easy reach of the person required to operate the valve. The use of such sprocket wheels in substitution for valve hand wheels is objectionable, however, because the wheel for any valve must be specially made and fitted, there being so many variations in the sizes of valves and in the conditions of their installation and the space which is provided for receiving them that it is impossible for manufacturers and dealers in valves to keep sprocket wheels in stock adapted to supply all the various demands. It results, therefore, that when the owner of a plant in which the valves are installed, as above described, desires a sprocket wheel to be substituted for the ordinary hand wheel, he must order the sprocket wheel specially, at considerable expense and is subjected to considerable delay before it can be applied to the valve.

The object of my invention is to do away with the delay and a large part of the expense heretofore invariably incident to the fitting of valves with sprocket wheels, by providing a device which is adapted to coöperate with a chain or the like and may be applied to the valve wheel itself in a few moments of time, and which moreover is adapted to be thus applied to hand wheels of varying sizes so that a few stock sizes of the device or attachment may serve to equip all the types of hand wheel encountered in practice; whereby a demand for equipping any valve with such device may be supplied without delay.

Having thus indicated one of the purposes of my invention, but without intending thereby to restrict the use of the invention to that particular purpose, I will now describe an embodiment of the invention, with modifications thereof, in connection with the drawings which accompany and form a part of this application.

Figure 6:
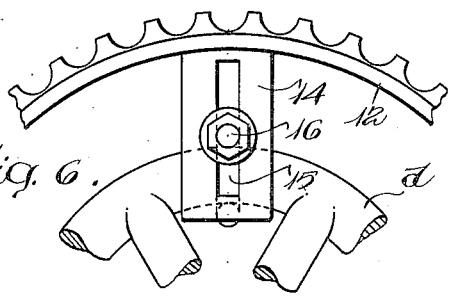
Figure 7:
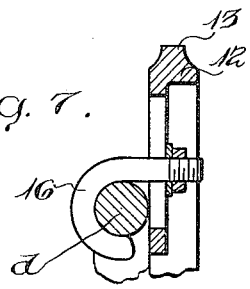
Figure 8:
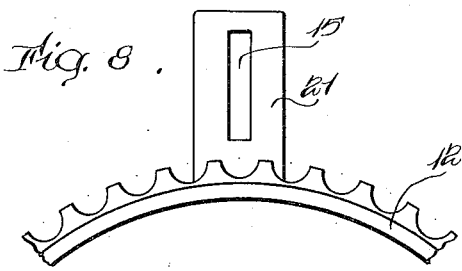
Figure 9:
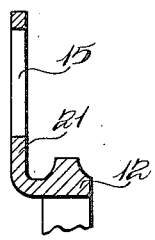
Figures 10, 12:
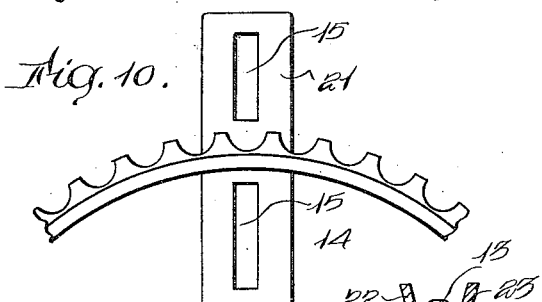
Figure 11:
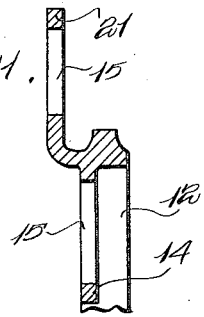

In the drawings, Figure 1 is a view illustrating the location in a room of a valve with which the device constituting my invention is adapted to be used. Fig. 2 is an end view of a valve wheel with my device applied thereto. Fig. 3 is a cross section of the wheel and sprocket device shown in Fig. 2. Fig. 4 is a side view and Fig. 5 a cross section of a portion of a valve hand wheel and of a modified form of my attachment. Figs. 6 and 7 are similar views of the attachment shown in Figs. 2 and 3 illustrating the capacity for adjustment of the same to different sizes of valve wheels. Figs. 8 and 9 are similar views of a modification of the device adapted for wheels of larger diameter than the device itself. Figs. 10 and 11 are similar views showing a further modification adapted for wheels of both larger and smaller diameter. Fig. 12 is a sectional view showing a further modification.

The same reference characters indicate the same parts in all the figures.

Referring to the drawings, Fig. 1 illustrates one of the sorts of valve installation with which my present invention may be used. Here *a* represents a pipe line and *b* a valve having a stem *c* and a hand wheel *d*.

The pipe line is hung near the ceiling of a room or passage and so far above the floor thereof that the valve handle cannot be reached by one standing on the floor. e represents a chain which is passed around a sprocket element attached to the valve handle and hangs down far enough to be operated by a person standing on the floor. Obviously pulling the chain in one direction or the other opens or closes the valve.

Referring now to Figs. 2 and 3, which show one of the embodiments of my invention in detail, it will be seen that the attachment or sprocket device consists of an annulus 12 having teeth 13 on its outer periphery and having lugs 14 projecting inwardly, preferably radially, from its inner circumference. The teeth may be of any character adapted to take the links of any sort of sprocket chain, or any other chain for that matter. It is not necessary that the links of the chain and teeth should mesh perfectly, since the device is not a driving apparatus, and all that is required is that the chain should not slip when enough force is applied to close the valve tightly or open it.

There are preferably three lugs 14, as I have found that number best adapts the sprocket device for hand wheels of different sizes and characters, since the bolts carried by each of the three lugs can find spaces between the spokes of any of the hand wheels used in practice. In each lug is a slot 15 through which passes the end of a bolt 16, such bolt being hook shaped, as shown in Fig. 3, and passing partly around the rim of the hand wheel. A washer 17 and nut 18 are placed on the threaded end of the bolt at the opposite side of the lug from the hand wheel, and when the nut is tightened up, the hooked part of the bolt is drawn against the rim of the hand wheel and crowds such rim against the rear side of the lug. The slot 15 provides capacity for adjustment of the bolt in or out, whereby the same sprocket member may be applied to wheels of different sizes, between limits which are respectively the rim of the sprocket member and the inner ends of the lugs. For a wheel of such small diameter that there is no room for the bolt to pass between the inner end of the slot 15 and the inner circumference of the wheel rim, the bolt may be turned about, as shown in Figs. 6 and 7, so that its hooked end projects inwardly instead of outwardly from its shank.

Figure 5:
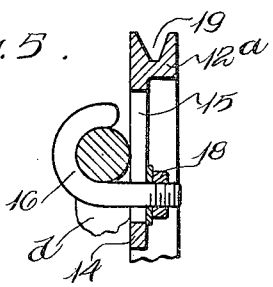

Figs. 4 and 5 are provided to illustrate a possible modification of construction by which the attachment is adapted to co-act with other chains than so-called sprocket chains. Here the annulus 12$^a$ is provided with a groove 19 adapted to receive an ordinary link chain, such as the chain 20 shown in Fig. 4. I have shown this form of the invention to make clear the fact that I am not limited to an attachment which is strictly a sprocket wheel so-called, that is, one having teeth to engage the coöperating chain, but that on the contrary my invention embraces any sort of circular element adapted to make such engagement with a chain of any sort, or a rope or other flexible transmitter of power, that it may be rotated by pulling upon such chain, etc. Further, as the operating part of the invention consists in the rim of the attachment and in attaching means, such as the bolts 16 adjustable in substantially radial slots, the invention is not limited to a construction in which disconnected lugs are provided to contain the slots.

In Figs. 8 and 9 I have shown such a wheel rim as that described in connection with Figs. 2 and 3, but which may equally well be of the sort shown in Figs. 4 and 5, or otherwise constructed, which is equipped with lugs 21 projecting outwardly so that it may be applied to a wheel of larger diameter. In this case, where the wheel rim is toothed, the lugs should be offset from the plane of the rim, as shown in Fig. 9, so as not to interfere with the chain. The lugs 21 are equipped with slots 15 to receive bolts of the sort already described applied in the manner described.

The modification shown in Figs. 10 and 11 has both inside lugs 14 and outside lugs 21 to adapt the device for attachment to any valve wheel, whether larger or smaller than the rim of the attachment.

It is evident that as the attachment is of simple construction containing a small amount of material, it can be made at small cost.

I should state here that I prefer to make the device out of metal and may make it either as a casting or as a forging, although I do not restrict myself to any particular metal or to any particular mode of manufacture. Further, that as the attaching means are adjustable, the same size of device may be applied to valve wheels of different sizes, wherefore it is necessary for the manufacturer or dealer to carry only few sizes of the attachment in stock in order to fit all sizes of valve wheels. Thereby it is made a practical possibility to supply any demand immediately, and the inconvenience and annoyance to the customer of the delay which has heretofore been experienced in obtaining sprocket wheels of the sort heretofore used, are avoided.

The device requires no fitting in being applied, but is applied just as it comes from stock by simply placing three bolts in the slots and in engagement with the rim of the hand wheel, as shown, and setting up the nuts thereon, such adjustment as is necessary to make it approximately central with the valve handle being easily and quickly accomplished. It is moreover not necessary that the attachment should be exactly concentric with the valve handle, since it will operate well enough if it is eccentric to a considerable degree.

I wish to make it understood that in thus particularly describing the use for which the attachment is particularly designed and adapted, I have not intended to limit the invention to that use, or to exclude its use for any other purposes for which it may be found suitable; also that in describing the attachment as being provided with three slots and three attaching bolts, I have not intended to limit the invention to one having only that number, but may provide any number of bolts and slots which may best serve the purpose.

It will be noted that the bolts 16 constitute clamping means for connecting the sprocket attachment to a hand wheel or the like. The particular form of bolt or clamping means here shown and described, while being preferred as a simple, inexpensive, and very efficient clamp, is not to be considered as a limitation of the invention, or as excluding any other form of clamping means adapted to answer the same purpose.

The modification which is shown in Fig. 12 is intended to illustrate a construction in which teeth of a sprocket wheel are equipped with a guard. In this figure, as in the others, 12 represents the rim of the attachment, and 13 represents teeth which may be of the form shown in Fig. 2, or may have any other form. On each side of the line of teeth projecting outwardly from the rim are flanges 22 and 23 which spread apart toward their outer edges and are adapted to keep the chain from slipping off of the rim. Any sort of chain may be used with this wheel.

What I claim and desire to secure by Letters Patent is:

1. An attachment of the character described comprising a circular member, a plurality of spaced lugs projecting from the periphery of said member in the plane thereof and having slots, and attaching clamps mounted in said slots to project away from such plane and being adjustable both radially and transversely of the wheel.

2. An attachment of the sort described comprising a wheel rim, lugs projecting approximately radially from said rim, each of said lugs having a radial slot, and a bolt projecting laterally from the plane of said wheel rim, passing through said slot and being adjustable therein, and having an offset portion adapted to embrace the rim of a hand wheel.

3. A wheel element adapted to be rotated by a chain or the like, and having in its structure substantially radial slots, hook shaped clamping members contained adjustably in said slots and passing through the same transversely of the wheel element, and nuts mounted on said members arranged to bear on the rims of said slots.

4. An attachment of the sort described comprising a circular rim with which is connected a slotted portion extending toward the center, a clamp mounted in the slot of said portion projecting laterally from the plane of said rim and adjustable in such slot having an offset end, and means for drawing said clamp toward the said portion.

5. An attachment comprising a wheel rim having outwardly extending lugs each provided with a slot, and a clamp mounted in each of said slots and adjustable therein and means for forcing said clamps toward said lugs.

6. An attachment of the character described comprising a wheel rim and lugs connected with said rim and extending both inwardly and outwardly therefrom approximately in the plane thereof and having slots adapted to receive clamping bolts.

7. The combination with a hand wheel of a sprocket wheel formed with slotted portions extending across the rim of said hand wheel and clamping means mounted in said slotted portion and engaging said rim.

8. The combination with a valve hand wheel of a sprocket member having slotted portions crossing the rim of the hand wheel, a bolt in the slot of each of said portions extending through the same and sufficiently far around the rim of the hand wheel to embrace the latter, and a nut mounted on said bolt for causing the latter to press the hand wheel against the said slotted portion.

9. The combination of a hand wheel having an annular rim, of an annular sprocket or pulley element provided with a plurality of inwardly directed lugs, each lug having a substantially radial slot, a hook shaped bolt contained adjustably in each of the said slots and partially passing about the hand wheel rim, and a nut on each bolt at the opposite side of the lug from the hand wheel adapted to draw the bolt toward said lug and thereby clamp the sprocket to the hand wheel.

In testimony whereof I have affixed my signature, in presence of two witnesses.

ISAAC N. BABBITT.

Witnesses:
H. A. RAHN,
E. P. BRANNEN.